United States Patent [19]
Nisenson et al.

[11] 3,782,827
[45] Jan. 1, 1974

[54] OPTICAL DEVICE FOR CHARACTERIZING THE SURFACE OR OTHER PROPERTIES OF A SAMPLE

[75] Inventors: Peter Nisenson, Burlington; Elliot S. Blackman, Chelmsford, both of Mass.

[73] Assignee: Itek Corporation, Lexington, Mass.

[22] Filed: Aug. 4, 1971

[21] Appl. No.: 168,938

[52] U.S. Cl. ............... 356/120, 356/167, 356/209, 356/237
[51] Int. Cl. ........................................ G01b 11/30
[58] Field of Search .................. 356/120, 167, 196, 356/200, 209–212, 237–239

[56] References Cited
UNITED STATES PATENTS

| | | | |
|---|---|---|---|
| 3,606,541 | 9/1971 | Sugano et al. | 356/167 X |
| 3,439,988 | 4/1969 | Breske | 356/120 X |
| 3,652,863 | 3/1972 | Gaskell et al. | 356/239 X |
| 3,481,672 | 12/1969 | Zoot | 356/167 |

OTHER PUBLICATIONS
Harrison, IBM Technical Disclosure Bulletin, Vol. 13, No. 3, August 1970, pages 789 and 790.

Primary Examiner—John K. Corbin
Assistant Examiner—F. L. Evans
Attorney—Homer O. Blair et al.

[57] ABSTRACT

An optical device is disclosed which is useful for characterizing the surface topography of an opaque sample and for characterizing other properties of transparent samples. In the reflecting mode, a laser is used to illuminate the surface of a rotating sample. Reflected laser light is focused at a pinhole aperture where its intensity is detected. Useful plots of the power spectrum of the reflected coherent light as a function of frequency are obtained which characterize the surface topography of the sample.

A transmitting embodiment of the device is also described wherein the transparent sample is mounted on the back side of a right-angle prism which has its hypotenuse side silvered. A laser beam enters the front side of the prism while the prism is rotated about the center of its hypotenuse. As in the reflecting mode, useful plots of the power spectrum of the transmitted, diffracted coherent light as a function of frequency are obtained which characterize properties of the sample.

Processes for characterizing surface properties of opaque samples or other properties of transparent samples are also described.

15 Claims, 21 Drawing Figures

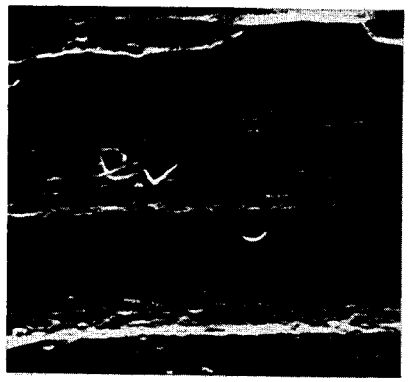
FIG. I(a). Ungrained Al Plate
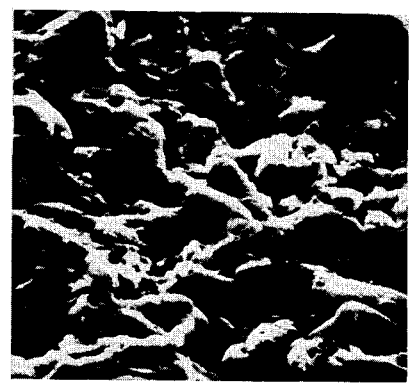
FIG. I(b). Sand Blasted Al Plate
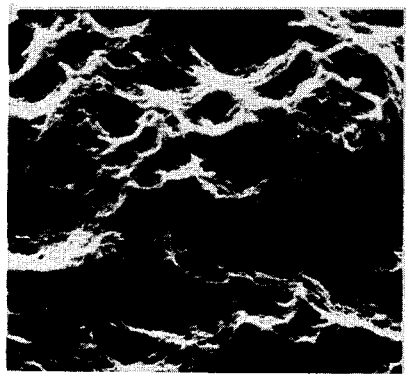
FIG. I(c). Chemically Etched Al Plate
FIG. I(d). Brush Grained Al Plate
*PETER NISENSON*
*ELLIOT S. BLACKMAN*
              *INVENTORS*
BY *David E. Brook*
              *ATTORNEY*

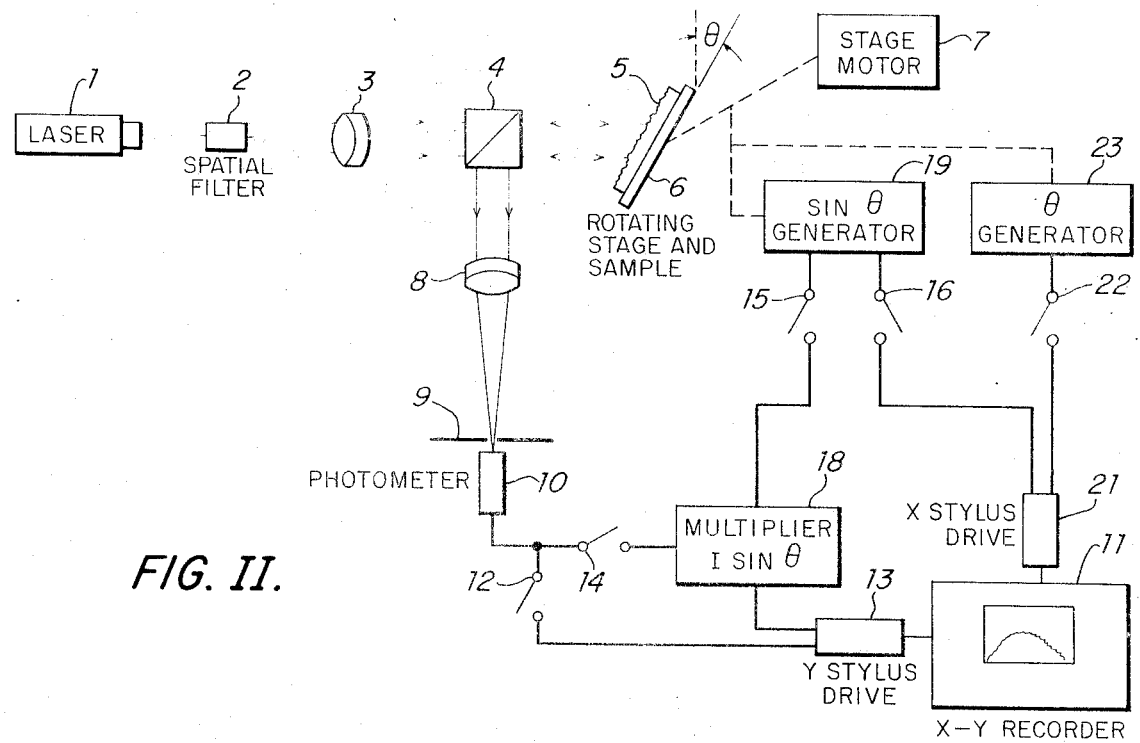
FIG. II.
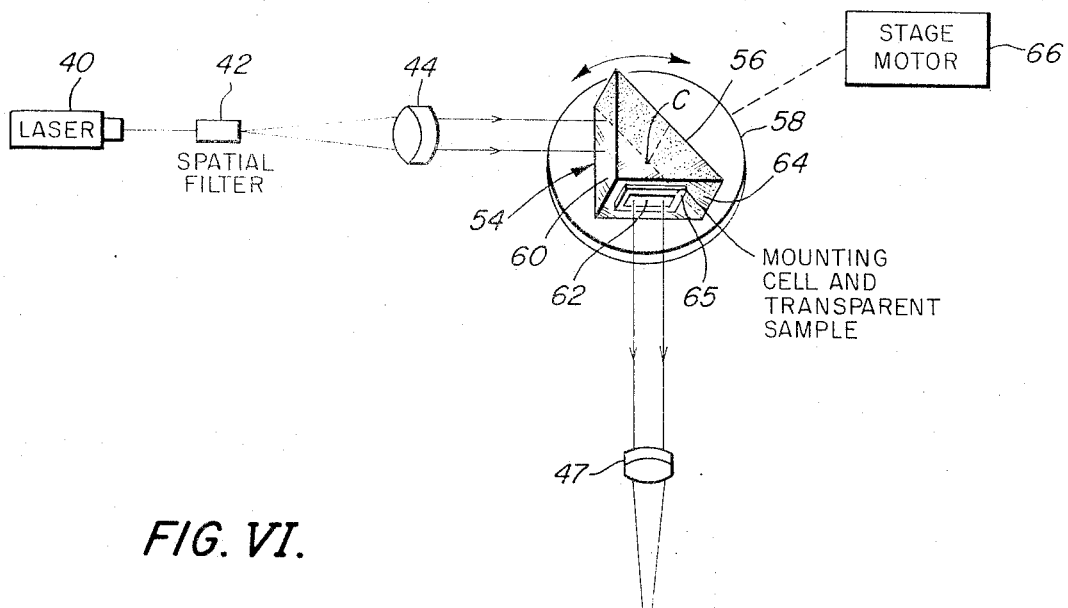
FIG. VI.

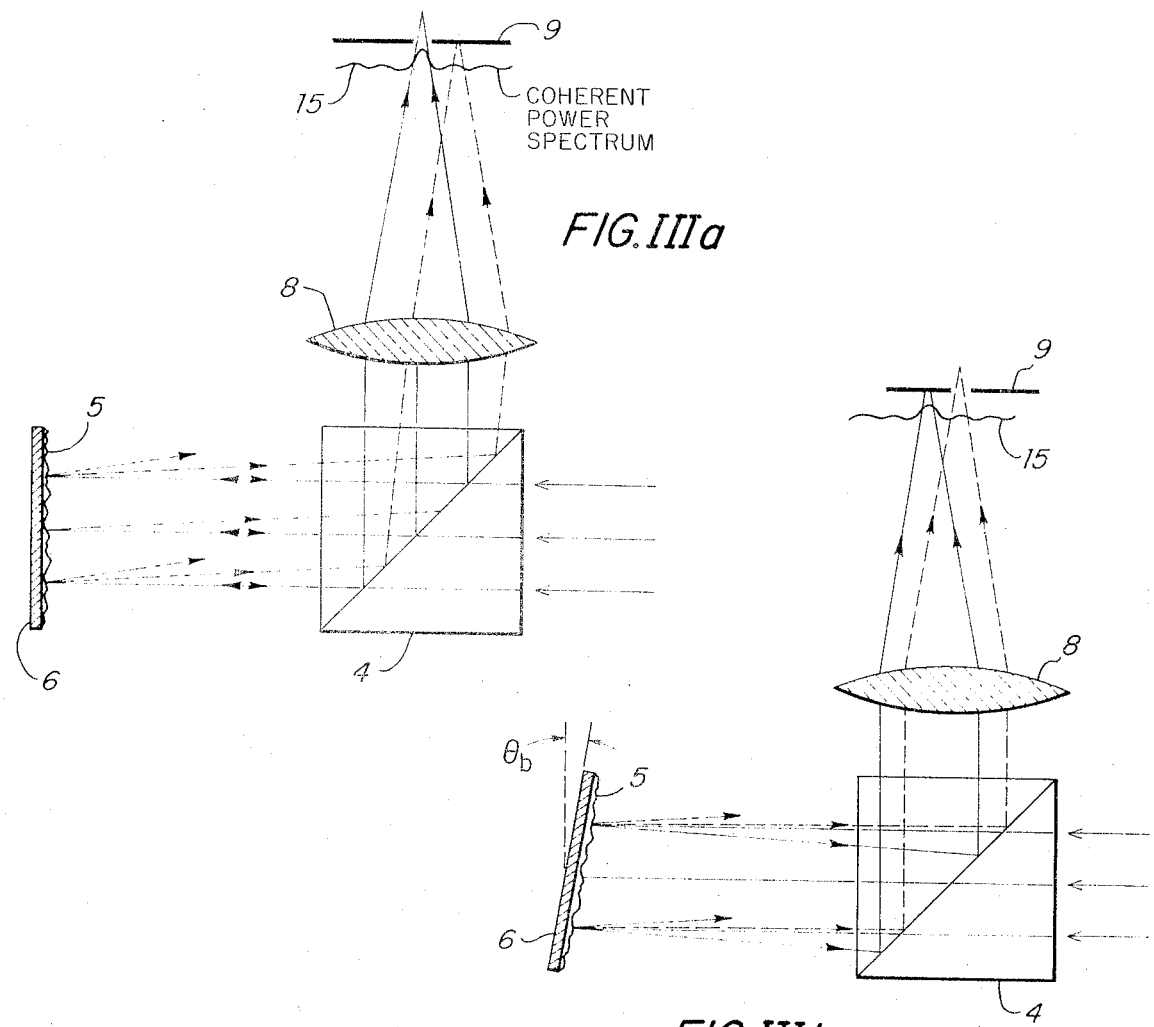
FIG.IIIa
FIG.IIIb
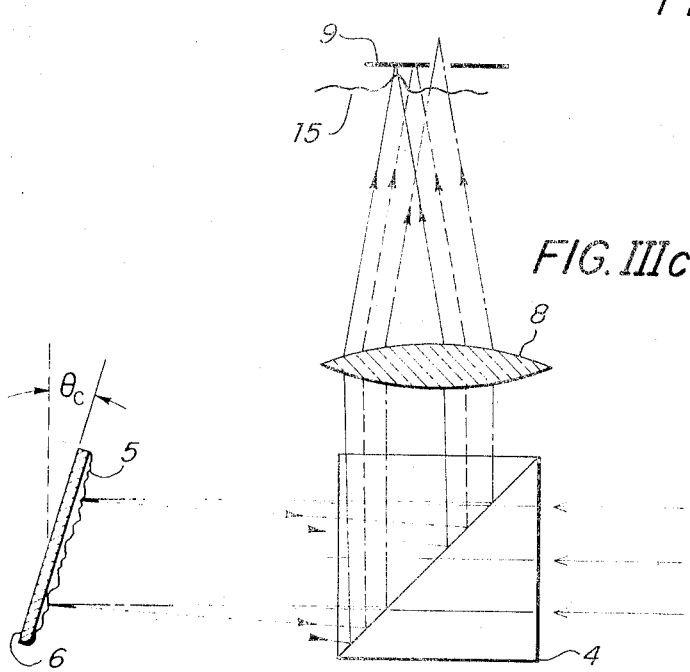
FIG.IIIc
Peter Nisenson
Elliot S. Blackman
INVENTORS.
BY David E. Brook
ATTORNEY.

PATENTED JAN 1 1974
3,782,827
SHEET 4 OF 5
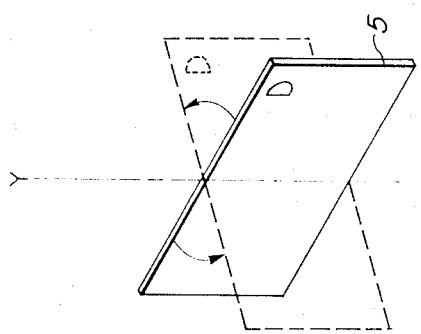
FIG.IVe
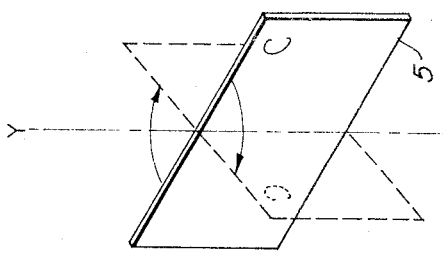
FIG.IVd
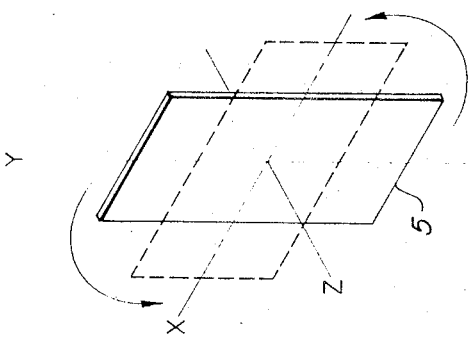
FIG.IVc
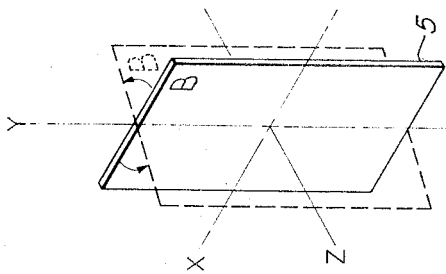
FIG.IVb
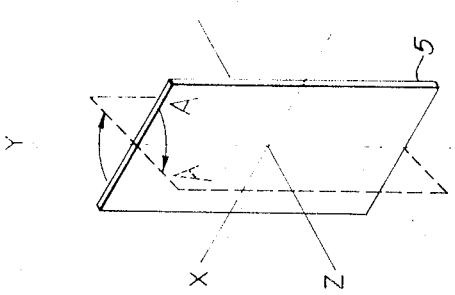
FIG.IVa
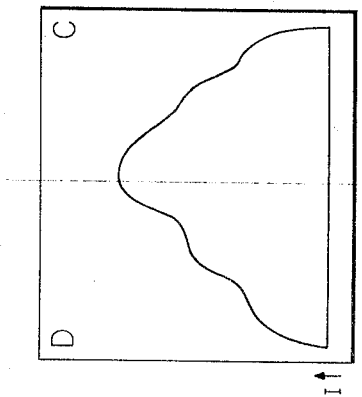
FIG.Vc
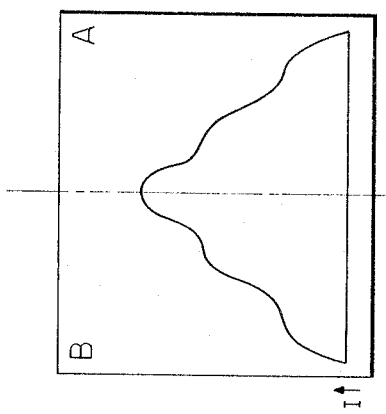
FIG.Vb
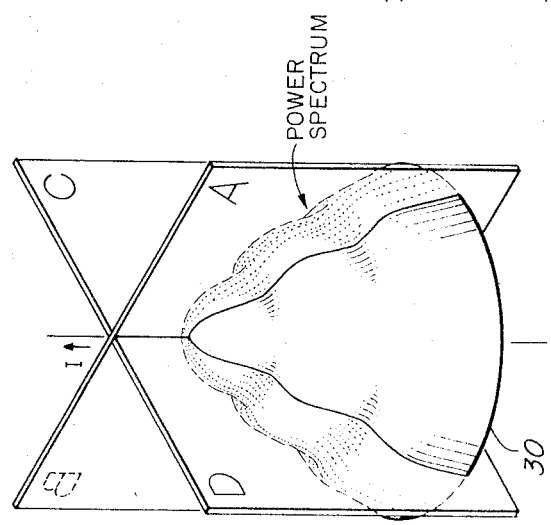
FIG.Va
Peter Nisenson
Elliot S. Blackman
INVENTORS.
BY David E. Brook
ATTORNEY.

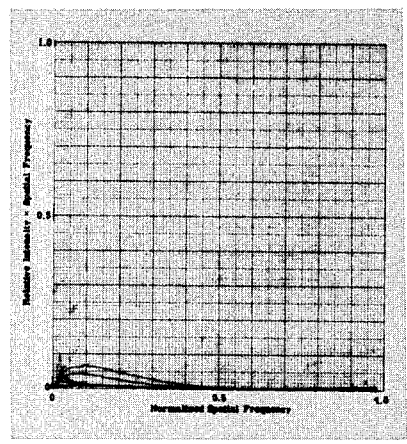
FIG. VII (a). Ungrained Al Plate
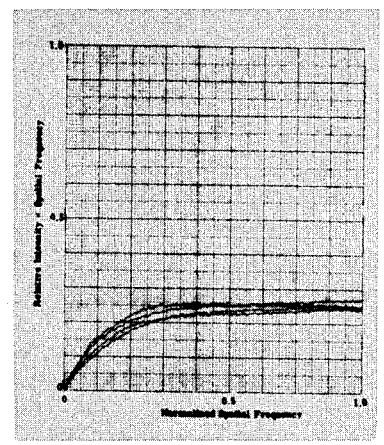
FIG. VII (b). Sand Blasted Al Plate
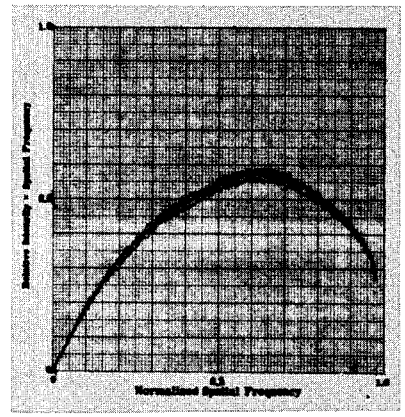
FIG. VII (c). Chemically Etched Al Plate
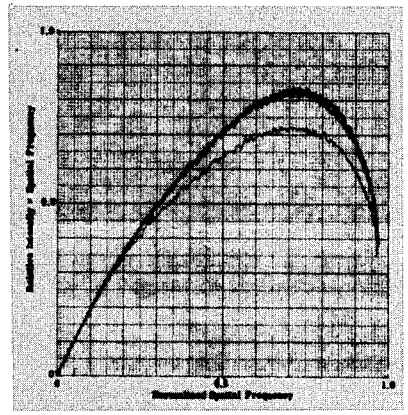
FIG. VII (d). Brush Grained Al Plate
PETER NISENSON
ELLIOT S. BLACKMAN
INVENTORS
BY David E. Brook
ATTORNEY

OPTICAL DEVICE FOR CHARACTERIZING THE SURFACE OR OTHER PROPERTIES OF A SAMPLE

BACKGROUND OF THE INVENTION

1. Field of the Invention

This invention relates to an optical device for characterizing the surface topography of an opaque sample or other properties of a transparent sample through the use of reflected or a transmitted coherent light.

2. Description of the Prior Art

It is often important, and sometimes even critical, to characterize the surface properties of a sample. For example, it is often critical in controlling the quality of such things as lithographic printing plates, paper, the machine finish on metals, optical components, drafting film, etc. to be able to characterize the surface of these materials. One can readily see that there are almost an infinite number of surface topographies possible.

The science of characterizing surface topographies is known as surface metrology. Generally, surface metrology includes characterization of the following: (1) surface roughness including average height, profile and maximum height or width; (2) waviness including average height, profile and maximum height or width; (3) error in form including flatness, roundness, contour and straightness; and (4) relationships including parallelism, concentricity and squareness.

Prior art devices available for characterizing surface topographies generally included stylus-type and optical-type devices. Stylus-type devices are the most common because they are relatively inexpensive and simple to understand and use. However, they do not always provide an accurate and precise characterization of surface topography.

Optical methods have the advantage of not requiring surface contact which substantially eliminates the possibility of damage to the surface which exists with stylus-type devices. Optical devices also provide three-dimensional coverage of the surface to be characterized. On the other hand, optical methods have not always proved satisfactory since many such devices are expensive, difficult to use, and provide insufficient data or data which are difficult to interpret.

It would be desirable, therefore, to provide a simple optical device capable of directly providing a more exact description of surface topography than has heretofore been available. The existing need for such a device has been recognized by noted authors in the field whom have concluded that the proper goal should be to provide an instrument which would yield an exact description of surface topography. See Bryan, James; "Resume and Critique of Papers in Part Eight"; *International Research in Production Engineering;* 1963 at page 654.

In like manner, there is also a need for a simple optical device capable of characterizing or performing operations on transparent samples.

SUMMARY OF THE INVENTION

The invention relates to optical devices and processes for measuring the coherent power spectrum of coherent light reflected from or transmitted through a sample having properties to be characterized. Diffraction patterns of the reflected or refracted coherent light beam can be related to various properties of a sample. By measuring the coherent power spectrum of the reflected or refracted coherent light, the particular properties of the sample under study can be characterized.

In an embodiment for characterizing surface topography of a reflecting surface, a coherent light source, such as a laser, provides a beam which is directed through a spatial filter, collimating objective and beam splitter onto the sample's surface. The sample is mounted on a rotating support. Surface irregularities modulate the reflected coherent beam which is passed back through the beam splitter and directed through a transforming objective to focus it at a pinhole aperture which has a phototube positioned behind it. The pinhole aperture is located in the back focal plane of the reflected light. Useful plots of the power spectrum of the reflected coherent light are obtained which characterize the surface topography of the sample.

Transparent samples are mounted differently. In one embodiment, a right-angle prism which has its hypotenuse silvered is mounted on a rotating table so that the prism rotates around the center of its hypotenuse. The transparent sample is mounted on the back prism face and the coherent light beam is directed through the front prism face. This device also provides useful plots of the power spectrum of the transmitted, refracted coherent light which can be used to characterize various properties of the sample.

In general, the desirable features of stylus-type devices are preserved. For example, the devices described herein are extremely simple from a mechanical point of view because they usually involve only one moving part. Additionally, these devices normally require only low-quality optical components, and the devices are easy to use contrasted to other optical devices for the same purpose which often require sophisticated alignment techniques, difficult data reductions and analyses, extensive vibration control, etc.

On the other hand, since the new devices are non-contacting in nature, some of the best features of previously available optical devices are also preserved. Additionally, the new devices are independent of the distance from the object and do not require that the object itself be held immobile. Since the sample doesn't have to be an integral part of the device as in some prior devices, it is possible to use the devices described herein to determine surface properties of large structures such as walls. Because the sample can be moved, it is also possible to use the devices described herein as a quality control device as in a production line where the device would scan the surface properties of items being moved past the device.

Since the new devices measure the coherent power spectra of reflected or refracted light, it is also an advantage that known relationships have been established and are available between coherent power spectra and rough surface statistics. For example, See *The Scattering of Electromagnetic Waves from Rough Surfaces* by Petr Beckmann and Andre Spizzichino, Pergamon Press, London, 1963. A most important advantage is the exact categorization of surface topographies that can be obtained relatively easily using devices as described herein. For example, the symmetry or directionality of a surface roughness pattern can be easily determined with the new devices. This was impossible or at least very difficult with many of the prior art devices.

Another important advantage is that these new devices are capable of measuring statistical average values of surface topographies over either a large or small section of the surface. In order to obtain representative surface roughness data with some prior methods, such as stylus-type devices, a number of traverses had to be made and the resulting data reduced, weighted and/or averaged to give a characterization equivalent to one scan with the device described herein.

Some additional advantages are inherent with the devices or the methods of using them. For example, the devices are extremely flexible in being able to characterize many different types of surfaces by simple adjusting their sensitivity to the fine or gross regions of roughness. Also, as has been stated above, the devices can be used in either a transmission or reflecting mode making them suitable for measuring surface characteristics or other properties of opaque or transparent materials.

A most unique and important feature of the new devices is that they produce a direct display of usable information. It is not necessary to manipulate the data obtained to have meaningful comparisons. In a preferred method of operation, plots can be directly obtained allowing an operator to display the surface's power spectra and such plots can be used for direct sample to sample comparisons. This is particularly important in quality control applications where the emphasis is often on testing samples quickly.

BRIEF DESCRIPTION OF THE FIGURES

FIG. 1 presents scanning electron photomicrographs of various aluminum plate surfaces including: (a) an ungrained aluminum surface; (b) a sand-blasted aluminum surface; (c) a chemically etched aluminum surface; and (d) a brush-grained aluminum surface.

FIG. II illustrates in diagrammatic form an optical device of this invention for characterizing the surface of an opaque material.

FIGS. IIIa—IIIc illustrate in diagrammatic form the translation of a coherent power spectrum of light reflected from a sample's surface as the sample is rotated.

FIGS. IVa—IVc illustrate in diagrammatic form how different scans of the coherent power spectrum are obtained by rotating the sample and by turning the sample in its own plane.

FIGS. Va—Vc illustrate in diagrammatic form two dimensional scans obtained of a three dimensional power spectrum by rotating and turning the sample.

FIG. VI illustrates in diagrammatic form an optical device of this invention for characterizing properties of a transparent sample.

FIGS. VIIa—VIId present actual plots obtained using an optical device of this invention to characterize aluminum plate surfaces.

THEORY OF THE INVENTION

The following theoretical discussion is presented as an aid to understanding this invention.

A well known result in physical optics is the Fourier transforming property of a converging lens. Goodman, J. W.; *Introduction to Fourier Optics;* McGraw Hill Book Co. (1968). If an object is located in front of a converging lens (object plane), and is illuminated by a collimated quasimonochromatic wave propagating in a normal direction to the x–y plane (either in reflection or, for a partially transparent object, in transmission), the distribution of amplitude and phase in the back focal plane of the lens (frequency plane) is the Fourier transform of the amplitude and phase distribution right in front of the object.

The equation for this relationship may be written in the following form (See *Introduction to Fourier Optics*, pg. 85, equation 5-15);

$$U_f(x_f, y_f) = \frac{A \exp\left[j\frac{k}{2F}(x_f^2 + y_f^2)\right]}{jf} \int\int_{-\infty}^{\infty} t_o(x, y) \exp\left[-j\frac{2\pi}{\lambda F}(xx_f + yy_f)\right] dx\, dy$$

(Eq. 1)

where:

$U_f$ is the field distribution in the back focal (frequency) plane $A$ is the amplitude of the illuminating wave $k = 2\pi/\lambda$ is the wave number $F$ is the focal length of the lens $x_f$ and $y_f$ are coordinates in the back focal plane of the lens $t_o(x,y)$ is the object reflection or transmission function multiplied by the illuminating wavefront $x$ and $y$ are coordinates in the object plane.

The exponential factor inside the integral is an expression for a plane wave having direction cosines $x_f$ and $y_f$. Therefore, the Fourier transform operation expands to $t_o(x,y)$ into its plane wave components. The actual form of $t_o(x,y)$ is $$t_o(x,y) = A(x,y) \exp j[\phi(x,y) + \alpha x + \beta y]$$

In Equation 2, $A(x, y)$ represents the amplitude and $\phi(x, y)$ represents the phase or depth distribution across the object. In reflection, the retardation is equal to twice the phase (or depth) of the object. In the last terms of the exponential, $\alpha$ and $\beta$ are the tilts of the object around the $x$ and $y$ axes respectively. When Equation 2 is inserted into Equation 1, and abbreviating the factor outside the integral with $C$, the following is obtained:

$$U = C \int\int A(x,y) \exp j 2[\phi(x,y) + \alpha x + \beta y] \exp[-jk/2F(xx_f + yy_f)]\, dx\, dy \quad (Eq.\ 3)$$

or $$U = C \int\int A(x,y) \exp j 2\phi(x,y) \exp[-jk/2F\,(x_f - 2\alpha)x + (y_f - 2\beta)y]\, dx\, dy \quad (Eq.\ 4)$$

If we let $x_f - \alpha = x_f'$ and $y_f - \beta = y_f'$ then $$U = C \int\int A(x,y) \exp t_o(x,y) 2\phi(x,y) \exp -jk/2F\,[x_f' x + y_f' y]\, dx\, dy \quad (Eq.\ 5).$$

This is the same form as Equation 1 except that the coordinate origin has been shifted by $(\alpha, \beta)$ in the frequency plane. This means that as the object is tilted, the distribution in the back focal plane translates across the object by distances $\alpha$ and $\beta$ in the $x_f$ and $y_f$ directions, respectively. The intensity distribution in the frequency plane is given by the absolute value squared, $|U_f|^2$, and is called the coherent power spectrum of the object.

If, as in the reflection mode discussed here, the illuminating wave is normal to the $x$–$y$ plane and the object is tilted around the $y$ axis, the spectrum translates in the $x_f$ direction. As the object rotates around the $y$ axis, if a pinhole aperture with a photosensor behind it is placed on-axis and the output recorded, the resulting trace will be a cut through the power spectrum.

The transmission mode discussed may be analyzed in an equivalent manner. It can easily be shown that operation of the device in the prescribed manner will yield an equal tilt, with respect to the object, in the illuminating and pickup directions. The spectrum translates across the frequency plane and is scanned in the same way. It can also be shown that the effect of refraction within the prism corrects most of the translation of the beam across the object (until the angle of incidence closely approaches 45°).

Both modes provide a simple method for making measurements of power spectra over extremely wide frequency bands.

DESCRIPTION OF THE PREFERRED EMBODIMENTS

As stated above, the optical devices and processes described herein provide a characterization of surface roughness or other properties by detecting the coherent power spectra of light reflected from or transmitted through samples. Representative embodiments and other descriptive material are presented in the Figures and concomitant explanatory material now given.

FIG. I presents scanning electron photomicrographs (2200x) of aluminum plate surfaces treated in a variety of ways to produce rough surfaces.

FIG. I(a) shows an ungrained anodized aluminum plate surface which would not generally be categorized as a rough surface.

FIG. I(b) shows an aluminum plate surface which has been sand-blasted to roughen it. It exhibits a low frequency, coarse structure with a fine structure superimposed thereon. The surface is also statistically asymmetrical.

FIG. I(c) shows an aluminum plate surface which has been chemically etched to roughen it. A statistically symmetrical, deep pitted surface which has ridges with sharp peaks and smooth walls is the result as can be seen.

FIG. I(d) shows a brushed-grain aluminum plate surface. The topography is rough and irregular with both coarse and fine irregularities. This surface exhibits considerable statistical asymmetry in one direction which is believed to be caused by the directionality of the brush rotation.

Some of the differences which can be observed in the scanning electron photomicrographs of FIGS. I(a)–(d) have been impossible or difficult to characterize with previously available surface roughness measuring devices. It is recognized, however, that these characteristics play an important and sometimes critical role in many applications.

FIG. II is a diagrammatic illustration of an embodiment of this invention suitable for measuring coherent power spectra of reflected light from opaque samples. Laser 1 is used to provide a source of coherent light. Suitable lasers include helium-neon, argon, krypton, etc., or pulsed laser sources such as gallium arsenide coupled with proper electronic circuitry and logic.

Laser 1 could be replaced by other sources of light which yield useful and self-consistent results. However, there are a limited range of conditions over which the results for different sources could be directly compared with one another and over which the analysis, given above under *Theory of the Invention*, is valid. These conditions are:

1. The source diameter must be smaller than the width of the scanning aperture — the aperture size is set by the desired spatial frequency bandwidth resolution. (The source size determines the "spatial coherence" of the source.)

2. The maximum wavelength (spectral) bandwidth of the source, $\Delta\lambda$, which determines the temporal coherence of the source, is given by the relation:

$$\Delta\lambda \leq \lambda \cdot \Delta\theta / 2 \sin \theta_{max}$$

where:

$\lambda$ is the mean wavelength of the source $\Delta\theta$ is the angular width of the scanning aperture $\theta_{max}$ is the maximum angle of rotation by the sample.

Since the device described herein measures the coherent power spectrum of diffracted light, the light input must be at least partially coherent. In general, the amount of coherency required depends on the particular application. It is preferred to use light sources which emit moderately coherent light. Sources such as lasers which emit substantially coherent light are most preferred.

The laser beam is expanded and optical noise is removed by spatial filter 2 and collimated by collimating objective 3. A beam splitter 4 divides the beam into two parts, one of which is reflected and discarded. The other part is transmitted by beam splitter 4 to the surface of sample 5, an opaque sample whose surface roughness is to be characterized. A rotating stage 6 is used to support sample 5. Stage 6 is rotated around an axis through the plane of the sample's surface by stage motor 7.

The laser beam is diffracted by the surface of sample 5 and some portion of the diffracted coherent light is directed back toward beam splitter 4. As before, the reflected light is split into a reflected portion and a transmitted portion. This time, the transmitted portion is discarded and the reflected portion is directed through transforming objective 8 which focuses the reflected light at pinhole aperture 9. An intensity detector such as a photometer 10 is located directly behind pinhole aperture 9.

Pinhole aperture 9 is positioned at the back focal plane of the reflected light. Only reflected light which is backscattered from the surface of sample 5 in a direction antiparallel to the illumination direction reaches photometer 10.

Because the sample 5 is rotating, the angle that the illuminating beam makes with the normal direction to the sample, $\theta_I$, can vary from 0° to 90°. The light which reaches the photometer 10 is that component which has an angle of incidence of $\theta_I$ and is scattered by the surface of sample 5 at an angle of $\theta_D$ where $\theta_I = -\theta_D$.

The spatial frequency, $x_f$, of the component diffracted by an object where the incident field makes an angle $\theta_I$ with the normal to the object and the component is diffracted at an angle $\theta_D$ with the normal is given by $x_f = \sin \theta_I - \sin \theta_D / \lambda$. Therefore, in this case the spatial frequency of the diffracted component is given by $x_f = 2 \sin \theta / \lambda$.

A variety of data, particularly in the form of plots, can be obtained from the apparatus shown. In one embodiment, a voltage signal proportional to the intensity sensed by photometer 10 can be used to drive the recording pen in the $y$ direction on $x$-$y$ recorder 11 by closing switch 12 thereby connecting it to $y$ stylus drive 13. In another alternative output embodiment, a voltage signal from photometer 10 is multiplied by the sin $\theta$. This is accomplished by opening switch 12 and closing switches 14 and 15. Multiplier 18 then performs the desired multiplication of the signals from photometer 10 and sin $\theta$ generator 19. The output signal from multiplier 18 is connected to stylus drive 13.

The $x$ axis of $x$-$y$ recorder 11 can be made representative of sin$\theta$ or $\theta$. In the former embodiment, switch 16 is closed to connect sin $\theta$ generator 19 to $x$-stylus drive 21. In the latter, switch 16 is opened and switch 22 is closed to connect $\theta$ generator 23 to $x$-stylus drive 21.

Thus, the $y$ axis of the $x$-$y$ recorder 11 can be made to represent either light intensity (I), or light intensity (I) multiplied by sin $\theta$. In like manner, the $x$ axis of $x$-$y$ recorder 11 may represent either $\theta$ or sin $\theta$. Therefore, $x$-$y$ recorder 11 can display directly plots representing: (I) v.$\theta$ ; (I) v. sin $\theta$ ; (I) $x$ sin $\theta$v.$\theta$ ; or (I) $x$ sin $\theta$ v. sin $\theta$.

When the x axis of recorder 11 corresponds to sin $\theta$, its scale in inversely proportional to the size of the scatterers on the test surface. A conventional term for inverse size is spatial frequency. Multiplication of intensity (I) by sin $\theta$ on the Y axis is equivalent to integrating the scattered intensity over all azimuthal angles for a given scattering angle (for an isotropic surface). This has the effect of emphasizing the high angle (high spatial frequency) scattering while deemphasizing the low spatial frequency region. When intensity (I) is represented directly on the Y axis, greater emphasis is placed on low spatial frequencies.

In all measurements, the photometer 10 is adjusted so that the measured value of reflection at normal incidence ($\theta_f$=0) gives a full-scale deflection on the chart recorder before introducing the sin $\theta$ weighting factor. This normalization removes the effect of differences in the reflectivity of various test surfaces, thereby allowing direct comparison or contrast between scans of most rough surfaces.

As described above, since an $x$-$y$ recorder is used, the sample is rotated at a linear velocity. If, however, the linear drive mechanism is replaced by a drive which rotates the sample at a velocity proportional to the arc-sin of $\theta$, the $x$-$y$ recorder can be similarly replaced by a recorder with a time base drive on the $x$ axis. The arc-sin drive mechanism thereby causes the $x$ aXis to be proportional to sin $\theta$.

The coherent power spectrum of light reflected from the sample's surface is displayed in the back focal plane of the transforming objective 8. As sample 5 is rotated, its power spectrum translates across pinhole aperture 9. Thus, this device accomplishes a scanning of the power spectrum, i.e., pinhole aperture 9 scans a line cut through the power spectrum.

Translation of the coherent power spectrum is illustrated in FIGS. III(a) –(c). Coherent light enters beam splitter 4 from the right in each case. The transmitted portion strikes the rough surface of sample 5 and is diffracted by it. Reflected light which passes back to and is reflected by beam splitter 4 is focused by lens 8 at pinhole aperture 9. Before sample 5 is rotated, the coherent power spectrum 15 is located as shown in FIG. III(a). In FIG. III(b), sample 5 has been rotated clockwise through an angle $\theta_b$ which has caused the coherent power spectrum 15 to translate across pinhole aperture 9 from right to left as shown. Further rotation of sample 5, as for example through an angle $\theta_c$ as shown in FIG. III(c), causes a further translation of the coherent power spectrum 15 from right to left. In practice, sample 5 is usually rotated through an angle of 90°. Rotation of sample 5 in the other direction, i.e., counterclockwise, would cause the coherent power spectrum to translate across the pinhole aperture 9 from left to right.

Rotating the sample in different directions and turning the sample in its own plane and again rotating it in different directions, as shown in FIGS. IV(a)–(e), provides a method of obtaining cuts of the power spectrum of a sample from different directions. This might be desirable, for example, to determine the amount of statistical symmetry in a sample's surface roughness. Normally, four scans are desirable and can be obtained by rotating the sample as shown in FIG. IV.

In FIG. IV(a) sample 5 is initially rotated around the $y$ axis in a clockwise direction for 90°. In FIG. IV(b), sample 5 is then rotated in a counterclockwise direction about the $y$ axis to a position 90° from its original position. In FIG. IV(c), sample 5 is turned 90° about the $z$ axis (within its own plane) before further rotations are made. Then, the sample is once again rotated 90° clockwise, FIG. IV(d), and counterclockwise, FIG. IV(e), about the $y$ axis. Thus, four separate plots can be obtained which are representative of four cuts of the power spectrum.

FIG. V illustrates the type of two-dimensional data obtainable from the three-dimensional power spectrum by rotating and turning the sample as shown in FIG. IV. In FIG. V(a), a power spectrum 30, such as one coherent light reflected from a rough rotating surface might have, is illustrated in three-dimensional form. The various cuts through power spectrum 30 made by rotating and turning the sample as in FIG. IV are illustrated by half-planes A, B, C and D. FIG. V(b) illustrates the corresponding two-dimensional data display obtained by combing the cuts made by half-plane A and half-plane B, respectively obtained as shown in FIGS. IV(a) and (b) by rotating the sample first 90° clockwise and then 90° in a counterclockwise direction. FIG. V(c) illustrates the corresponding two-dimensional data display obtained by combining the cuts made by half-planes C and D in FIG. V(a), which cuts are respectively obtained as shown in FIGS. IV(d) and (e) by rotating the turned sample first 90° in a clockwise direction and then 90° in a counterclockwise direction. As can be seen, the intensity (I) increases in the vertical direction in FIGS. V(a), (b) and (c).

Surfaces which have roughness patterns that are symmetric will reflect light differently than those with asymmetric surface patterns. These differences will result in different plots for the various cuts through a sample's power spectrum. By taking multiple cuts, the statistical symmetry of a sample's surface roughness patttern can be determined.

The discussion presented above deals chiefly with devices and methods for scanning the coherent power spectrum of reflected light, especially that reflected from rough surfaces.

It is also often desirable to be able to scan the coherent power spectrum of light diffracted by a transmitting sample. A device having this capability would be useful in analogue optical image processing, measuring grain power spectra, measuring fiber structure of paper, etc.

It should be first noted, however, that the desired translation of a coherent power spectrum of diffracted light from a transparent sample would not be accomplished by simply rotating a transparent sample in the path of a collimated beam and sampling the transmitted light in the spectral plane. This would only accomplish a foreshortening of the scale of the coherent power spectrum. With such an apparatus, the measuring aperture would sense only the zero frequency (direct transmitted) light component. A new device which will accomplish the desired scanning of the coherent power spectra of light transmitted through a transparent sample is illustrated in FIG. VI.

Many of the components of this device are the same as or equivalents to components used in the previously described device for scanning the coherent power spectrum of reflecting samples. Thus, laser 40 directs a beam of coherent light through spatial filter 42 and collimating objective 44 to a sample which has properties to be characterized. Similarly, modulated, diffracted light from the sample is passed through transforming objective 47 to a pinhole aperture 48 with a photometer 50 located directly behind it. In this embodiment, the photometer 50 is located on a horizontally translating stage 52 which is connected to the pinhole aperture 48 so that both translate coincidentally. The translating stage and pinhole aperture could also be used in the reflecting embodiment to monitor small increments in frequency if desired.

The output from photometer 50 is used to form plots as was the case in the reflecting mode. Mechanical and electrical components and circuits such as those shown in FIG. II for the reflecting mode, or other equivalents, can be used.

In the transmitting devices, however, the transparent samples are mounted in a unique manner. A right angle prism 54 made from optical quality glass is silvered on its hypotenuse side 56. Prism 54 has to be carefully chosen to have a refractive index so that there is only a slight translation of the beam across the sample surface for a large rotation. In order to avoid vignetting due to the simultaneous lateral translation of the beam and sample when prism 54 is rotated, transforming objective 47 should have a sufficiently large diameter. The prism 54 is mounted on a rotating table 58 which rotates about the center point C of the hypotenuse of the prism 54. The expanded, collimated laser beam enters prism 54 through its front face 60. A transparent sample, such as exposed photographic film 62, is mounted on the back face 64 of the right angle prism 54. One convenient way to mount film 62 on back face 64 of prism 54 is by the use of a glass liquid mounting cell containing an index matching liquid to thereby eliminate sample thickness variations. Other methods can be used, of course. The prism 54 and mounted sample 62 are rotated by turning on stage motor 66. which rotates stage 58 so that the prism 54 rotates as a unit around point C. Because of the rotation of the unit, the coherent power spectrum of diffracted light passed through prism 54 and sample 62 is translated across the spectral plane. Therefore, a line through the spectrum is sensed by photometer 50.

Mounting of photometer 50 on a horizontally translating stage 52 connected to pinhole aperture 48 allows small increments in frequency to be monitored. Rotation of right angle prism 54 allows monitoring of wide frequency ranges close to the optical cut off, and translation of stage 52 allows division of that frequency range into small but accurately measurable components.

FIG. VII presents actual plots of test sample surfaces measured by an apparatus similar to the one illustrated in FIG. II. The exact experimental set-up from which these plots were obtained was as follows.

A 1 milliwatt helium neon laser was used as a source. The beam was expanded and optical noise removed by a Gaertner spatial filter expander. A 2-inch focal length lens gave a collimated beam one cm. in diameter. The collimated beam of light was passed through a 1-inch cube beam splitter, which divided the light into two parts: one part was reflected and discarded, and the other part was transmitted by the beam splitter and illuminated the samples which were aluminum plates whose surfaces had undergone various treatments. The light was scattered by the surface and some of it was directed back toward the beam splitter. The reflected light from the sample's surface was split into two parts by the beam splitter: the transmitted portion was discarded and the reflected part passed through a 2-inch focal length lens which focused it at a pinhole aperture. Light that got to the phototube was only that which backscattered from the test plate in a direction antiparallel to the illumination direction. The test samples were mounted on a mechanism which rotated them around an axis passing through the plane of the samples' surfaces, so that the angle the illuminating beam made with the normal direction (or perpendicular) to the plate, $\theta$, varied from 0° to 90°. The velocity of rotation of the sample was set so that one trace (0° to 85°) took 15 seconds. The light getting back to the phototube was that component which was scattered by the surface at an angle $\theta$ to the normal, so the actual scattered component due to the combination of the angularly offset illuminating beam and pick-up angle was at an angle of $2\theta$ to the normal direction. The output voltage from the phototube went through an amplifier and was multiplied by the voltage output of a sinusoidal potentiometer which was linked to the plate rotator. The result was plotted on an $x$–$y$ plotter where the $y$ axis corresponded to the light intensity(I) multiplied by sin $(\theta)$, and the $x$ axis was driven by a voltage taken directly from the sinusoidal potentiometer. Therefore, the recorder plotted(I) $x$ sin $(\theta)$ versus sin $(\theta)$. This caused the $x$ axis scale to be inversely proportional to the size of the scatterers on the samples' surfaces. THe conventional term for inverse size is spatial frequency. Multiplication of the $y$ axis by sin $(\theta)$ was equivalent to integrating the scattered intensity over all asimuthal angles for a given scattering angle. This had the effect of emphasizing the high angle (high spatial frequency) scattering while de-emphasizing the low frequency region. In all measurements, the photometer as adjusted so that the measured value of the reflection at normal incidence ($\theta=0$) gave a full scale deflection (10 units) on the chart recorder (before introducing the sin $(\theta)$ y-axis weighting factor). The $x$-axis scale was also set so that a ten-unit deflection would correspond to the optical cut-off frequency (when $\theta=90°$). This is called normalization and removed the effect of differences in various samples' reflectivity, allowing direct comparison between the scans of these samples.

FIG. VII ($a$) presents a trace made from an ungrained aluminum plate surface such as that shown in FIG. I(a). This surface was highly specular and little energy was diffracted outside the normal direction. Four curves are plotted, corresponding to measurements of the surface in four orthogonal directions obtained as shown in FIG. IV. The differences between the curves shows that there is a definite directionality in the plate's surface presumably corresponding to the direction of the web movement when the metal sheet was produced. The observed smoothness of the ungrained plate gives a trace which, as predicted, has a low amplitude.

FIG. VII (b) is a plot made from an aluminum plate surface roughened by sandblasting such as that shown in FIG. I(b). This was a much rougher surface than the ungrained plate surface and the plots have a correspondingly increased amplitude on the y axis. The four curves demonstrate the asymmetry and directionality of the surface, probably due to the angle the stream of sand made with the plate surface. The plots also show that there is considerable fine structure on top of an overall coarse roughness, and this is demonstrated in the plots as the relatively high amplitude at high frequencies (as shown by the flatness of the curves at high spatial frequencies).

FIG. VII(c) presents plots of a chemically grained aluminum plate surface as shown in FIG. I(c). It may be observed that the surface, while fairly rough, had a roughness that was quite rotationally symmetrical (the curves are very close to each other) and also had considerably less fine structure than the sandblasted plate as shown by the fall off in amplitude at higher spatial frequencies.

FIG. VII (d) presents plots taken from a brush-grained plate surface such as that shown in FIG. I(d). From the plots, it is clear that this plate was obviously the roughest of the four sampled, and that this surface had considerable fine structure causing the peak of the trace to have a large amplitude at high spatial frequency values. The directionality of the roughness on this surface accounted for the one low curve. The directionality was probably due to the direction of the rotating brushes used to roughen the surface.

Data presented in FIG. VII illustrate the characterization of such gross surface roughness features as symmetry, directionality, coarseness of grains, etc.

While the data presented in FIG. VII is meant to demonstrate the differences due to gross changes in surface structure, the devices described herein are equally useful where considerable sensitivity to very small changes in roughness of a surface are present. For many applications, it is only the very small variations that concern an operator and the device described herein can quickly characterize such small variations.

Those skilled in the art will know or be able to determine by routine experimentation many modifications or equivalents of the specific devices and process steps described herein as being the preferred embodiments. These modified or equivalent devices and processes also fall within the scope of the appended claims.

What is claimed is:

1. An optical device for characterizing properties of a sample through the use of the sample's coherent power spectrum, comprising in combination:
   a. means to provide a beam of light which is at least partially coherent;
   b. means to direct said beam of light onto a portion of the sample; and,
   c. means to detect the coherent power spectrum of light modulated by said sample.

2. An optical device of claim 1 wherein said means to provide comprises a source of light which is at least moderately temporally and spatially coherent.

3. An optical device of claim 2 wherein said means to provide comprises a laser.

4. An optical device of claim 3 wherein said means to detect includes means to rotate the sample around an axis through the plane of the sample's surface.

5. An optical device of claim 4 wherein said means to detect further includes optical means to focus reflected light, a sampling aperture and a light intensity detector positioned to intercept the modulated focused light emitted from said sample in its back focal plane.

6. An optical device of claim 5 wherein said sample to be characterized is substantially opaque.

7. An optical device of Claim 6 wherein said means to direct includes a beam splitter positioned in the path of said coherent light beam and in the path of said reflected, modulated light.

8. An optical device of claim 7 wherein said light intensity detector contains a photomultiplier tube.

9. An optical device of claim 5 wherein the sample to be characterized is substantially transparent to said coherent light beam.

10. An optical device of claim 9 wherein said sample is mounted on one side of a right angle prism which has its hypotenuse silvered and said prism is mounted to rotate about the center of its hypotenuse.

11. An optical device of claim 10 wherein said coherent light beam enters the prism on its front face.

12. An optical device of claim 11 wherein said means to detect includes optical means to focus coherent light refracted through said sample and modulated by said sample and a light intensity detector positioned in the back focal plane of said modulated light.

13. An optical device of claim 12 wherein said light intensity detector comprises a photometer positioned on a horizontally translating member positioned at the back focal plane of said refracted, modulated light.

14. A method for characterizing a rough surface on a sample, comprising:
   a. rotating said sample;
   b. illuminating the rough surface of said rotating sample with coherent light;
   c. sensing the coherent power spectrum of light reflected from said rough surface.

15. A method of claim 14 wherein step (c) is accomplished by:
   a. focusing said reflected light at a pinhole aperture;
   b. sensing the intensity of reflected light at a point immediately behind said pinhole aperture.

* * * * *